(12) United States Patent
Vinkenvleugel et al.

(10) Patent No.: US 7,950,824 B2
(45) Date of Patent: May 31, 2011

(54) LIGHTING SYSTEM AND A COLOR INDICATOR PART THEREFOR

(75) Inventors: Lucius Theodorus Vinkenvleugel, Eindhoven (NL); Paul Philip Thursfield, Eindhoven (NL); Denis Joseph Carel Oers, Bocholt (BE)

(73) Assignee: Koninklijke Philips Electronics N.V., Eindhoven (NL)

( * ) Notice: Subject to any disclaimer, the term of this patent is extended or adjusted under 35 U.S.C. 154(b) by 297 days.

(21) Appl. No.: 12/301,035

(22) PCT Filed: May 14, 2007

(86) PCT No.: PCT/IB2007/051804
§ 371 (c)(1),
(2), (4) Date: Nov. 17, 2008

(87) PCT Pub. No.: WO2007/135610
PCT Pub. Date: Nov. 29, 2007

(65) Prior Publication Data
US 2009/0279292 A1 Nov. 12, 2009

(30) Foreign Application Priority Data
May 22, 2006 (EP) ..................................... 06114311

(51) Int. Cl.
*F21V 99/00* (2006.01)
(52) U.S. Cl. ........................................ 362/231; 362/243
(58) Field of Classification Search .................. 362/230, 362/231, 42, 243, 244, 245, 246
See application file for complete search history.

(56) References Cited

U.S. PATENT DOCUMENTS

| | | | |
|---|---|---|---|
| 6,200,002 | B1 | 3/2001 | Marshall et al. |
| 6,241,363 | B1 | 6/2001 | Lee |
| 2003/0174500 | A1 | 9/2003 | Kameda et al. |
| 2005/0157490 | A1 | 7/2005 | Klose |
| 2005/0225986 | A1 | 10/2005 | Holten et al. |
| 2005/0254241 | A1 | 11/2005 | Harwood |
| 2006/0001034 | A1 | 1/2006 | Park et al. |

FOREIGN PATENT DOCUMENTS

| | | | |
|---|---|---|---|
| EP | 1693615 A1 | | 8/2006 |
| GB | 2097909 A | * | 11/1982 |
| WO | 0141514 A1 | | 6/2001 |
| WO | 2005006815 A2 | | 1/2005 |
| WO | WO 2005/006815 A2 | * | 1/2005 |
| WO | 2005106323 A1 | | 11/2005 |
| WO | 2006056066 A1 | | 6/2006 |
| WO | 2006099732 A1 | | 9/2006 |

* cited by examiner

*Primary Examiner* — David V Bruce

(57) ABSTRACT

The present invention provides a lighting system with a color indicator surface (24, 30). The surface receives light via a cover (18) of the lighting system, mainly through internal reflection. Hence, the light from the light sources, here at least two different colored LEDs (14), is guided away from the main light emitting surface (20), such that well-mixed light with a lower intensity may be used to determine the color of the light. The color indicator surface may be a surface (24) of the cover (18), or may be a surface (30) of a separate outer part (26). The lighting system may be used to illuminate objects in houses, shops and so on. The color indicator surface provides a convenient and easily accessible color reference.

11 Claims, 1 Drawing Sheet

LIGHTING SYSTEM AND A COLOR INDICATOR PART THEREFOR

This application is a national stage application under 35 U.S.C. §371 of International Application No. PCT/IB2007/051804 filed on May 14, 2007, and published in the English language on Nov. 29, 2007 as International Publication No. WO/2007/135610, which claims priority to European Application No. 06114311.1, filed on May 22, 2006, incorporated herein by reference.

FIELD OF THE INVENTION

The present invention relates to a lighting system comprising at least two LEDs, each for emitting light of a different color, a housing, with a reflector that at least partly surrounds the LEDs and with a light exit opening, and an at least partly transparent cover in front of the exit opening, and a main light emitting surface in front of said light exit opening, facing away from the LEDs.

BACKGROUND OF THE INVENTION

Document WO2005/106323 discloses an apparatus for variable color lighting comprising at least two regulatable light sources, a rear reflector and a front diffuser. The front diffuser reflects part of the light back to the light sources, such that the longer effective path of the light improves the mixing.

A problem of this known apparatus is that it is in many cases not possible to check the color of the lighting. When it is desired to achieve a certain light effect, for example indoors, in houses, shops or elsewhere, it is often awkward to look into the lamp or light source, because of the, often, high luminance. Furthermore, many light effects cause one or more objects to be illuminated by the lighting system, but it does not suffice to check the resulting color of the illuminated objects, because they often have a color of their own. This makes it impossible to predict the result when the illuminated objects are changed.

OBJECT OF THE INVENTION

An object of the invention is to provide a lighting system that allows a more reliable and easier color check under many circumstances.

SUMMARY OF THE INVENTION

The object of the invention is achieved with a lighting system of the kind mentioned in the preamble, which lighting system comprises a part with a color indicator surface that is arranged to receive light from the LEDs that is internally guided by the cover, and the color indicator surface and the main light emitting surface are separate surfaces that make an angle with respect to each other. When light passes through a cover, there will always be some light that is guided by the cover, be it by internal reflection, scattering or otherwise. This light may be used to illuminate the color indicator surface. The color indicator surface is a surface that indicates to an observer the color, and the relative intensity, of the light that is incident on the part with the color indicator surface. When the light is sufficiently mixed, this observed light corresponds in color, and relative intensity, to the light emitted at the main light emitting surface. In other words, the color of the light may be checked or estimated on the color indicator surface. This surface is separate from the main light emitting surface, and may be positioned independently, hence in a more comfortable orientation for color checking, as will be explained below. Herein, 'separate' means either 'not touching' or, when the surfaces do touch, that there is an edge between the surfaces, indicating the borderline.

Furthermore, the intensity of the light from the indicator surface is much lower than in the case when an observer looks directly at the cover and into the light sources. This makes it safer and more pleasant to check the color. A further advantage of the lighting system according to the invention is that the color impression is independent of the illuminated objects. In other words, a kind of color reference is provided, in that it is always the color indicator surface which is used to check the color, and not e.g. a wall or other object. This allows a better comparison or color adaptation.

In the context of the present invention, the term 'transparent' is meant to include translucent, and other ways of transmitting light through a body. Furthermore, the two LEDs are each able to emit light, the color of the light from a first LED being different from the color of the light from a second of the two LEDs. In case more than two LEDs are used, not every LED needs to be of a different color, as long as in all there are at least two colors present, so that colors can be mixed.

In a special embodiment, the perpendicular to the color indicator surface and the perpendicular to the main light emitting surface enclose an angle $\alpha$ of at least 75°, in particular at least 90°. Such angles allow easy access to the color indicator surface for checking the colors without having to look at the light sources, and without having to move or rotate the lighting system. Since the color indicator surface is to be viewed from the outside, the said surface is an external surface. For similar reasons, the main light emitting surface is an external surface. Hence, both mentioned perpendiculars point outwardly with respect to the lighting system.

Strictly speaking, the above condition regarding the angle applies only when the main light emitting surface and the color indicator surface are flat surfaces. However, if the main light emitting surface is not flat, then one should take an average perpendicular, or the perpendicular that is nearest to the perpendicular of the color indicator surface under consideration. Furthermore, when (also) the color indicator surface is not flat, i.e. there is no tangent that lies in said surface, it should hold for at least 80% of the surface area of the color indicator surface that the local perpendicular makes an angle $\alpha$ of at least 75°, in particular at least 90°, with the (nearest) perpendicular to the main light emitting surface. This allows for a somewhat curved color indicator surface, while the main advantage of easy access remains.

In a particular embodiment, the cover comprises a diffuser. Such a diffuser not only provides more pleasant light, but also helps improve the mixing of the different colors in the light emitted by the lighting system. A diffuser redirects a substantial part of incident light, such as at least 5% to even 80-100%, in more than one direction. Even if e.g. the light supplied to the diffuser would comprise area-wise completely separated colors, i.e. zero mixing in the supplied light, then the emitted light, after passing through the diffuser, would mix quickly as the distance to the diffuser increases. Hence, when illuminating an object, which will always have a certain distance to the diffuser, the light incident on the object will be appropriately mixed.

The diffuser may be embodied according to any desired form or shape. It may comprise e.g. a foil or other layer applied to the cover, or it may be unitary with the cover, such as some kind of surface roughness provided in the cover, and so on. In the rest of this document, it is to be understood that the diffuser may be an integral part of the cover or may be a separate part.

In a special embodiment, the diffuser comprises a roughened surface. As already mentioned above, this provides good mixing, in that the cover remains mainly transparent, but partly back-scatters the light. What is also important and advantageous is that this scattering increases the amount of light that is guided by the body of the cover, in particular, towards the color indicator surface. Part of the light that is scattered by the surface roughness, or other diffusive elements, will travel in a new direction that is more parallel with the surface(s) of the cover, and some of the light will even be parallel with said surface(s) to such a degree that total internal reflection will occur. Especially this latter part of the light will substantially arrive at the color indicator surface, which will now be illuminated more brightly. What is more, the light that arrives at the color indication surface is not only brighter, but also very well mixed, since it is built up from all diffusive elements across the diffuser surface, with a much more limited effect of intensity weakening over distance, because of the total internal reflection for at least part of the scattered light. Hence, the color that appears on the color indicator surface is not only brighter but also much better mixed, and is hence a much better reference. Note that this mixing is achieved inside the cover, and hence at an extremely small depth.

In particular, the roughened surface comprises a surface that faces away from the LEDs. This is hence an external, outside surface with respect to the LEDs. The advantage of this is that it is more efficient to diffuse and guide light once it has entered a body, instead of upon entering the body. However, it is in no way excluded to have a roughened surface facing the LEDs, or a combination thereof.

It is noted that surface roughening is mentioned as a way to obtain a diffuser. It has the advantage that it is a well controllable way of providing a certain coefficient of diffusivity, or surface roughness. This surface roughness may even be appropriately changed if desired, by increased roughening or polishing, or providing some index matching fluid on the roughened surface. However, other measures to provide a diffusive effect may also be applied, such as providing diffusive elements in or on the material of the cover/diffuser and so on.

In a special embodiment, the color indicator surface comprises a circumferential surface. By providing such a surface, it is ensured that the color may be easily checked from all positions around the lighting system. This allows optimum freedom to position the lighting system. Of course, the circumferential surface may be faceted, i.e. comprised of a plurality of contiguous part surfaces. Alternatively, the color indicator surface need not be circumferential, but may also comprise a number of non-contiguous part surfaces, as long as a sufficiently easy access to the color indicator surface is ensured. In a special embodiment, the color indicator surface has a width of at least 1 cm, preferably at least 2 cm. Alternatively or in addition, the color indicator surface has a luminous surface area at least 50-100 $cm^2$, or covers at least 25% of the external surface area apart from the main light emitting surface. All these measures, separately or taken in combination, help to provide a sufficient field-of-view of the color indicator surface to ensure that the color may be seen sufficiently easily. Of course, the visibility and discernibility depend on the distance at which the color indicator surface is viewed. However, the above Figures hold for a viewing distance of about 2 m, i.e. a normal maximum viewing distance for a standing person, when viewing a lighting system in a house or shop. It goes without saying that a larger surface area or width, or in general a larger solid angle, helps in perceiving color better, and that a smaller width of, say, 5 mm could suffice in small lighting systems that are viewed from a closer distance.

In a particular embodiment, the cover comprises at its circumference a thickened part. This provides an elegant way of providing a sufficiently large surface area for the color indicator surface, which can be a surface of the thickened part. It is furthermore ensured that this surface at the thickened part will be "filled" with light, since the diffuser redirects the light in all directions. Hence, after internal reflection, this will ensure that even the thickened parts will receive light, albeit of course with a lower intensity. The thickened part may be a circumferential part, i.e. a continuous part all around the cover. Alternatively, the cover may comprise a number of non-contiguous thickened parts at its circumference, preferably as long as good access and visibility for the user is ensured. It is preferable for the thickened part(s) to be provided in a direction that faces away from the main light emitting surface. This ensures that the properties of said main light emitting surface remain unaffected. In particular, if said surface is flat in the areas without the thickened parts, it is advantageous when the total main light emitting surface with the thickened parts is still flat. A similar reasoning holds for a main light emitting surface with a certain curvature. Of course, it is not excluded that a main light emitting surface may have thickened parts, the surface of which projects beyond the main light emitting surface. Furthermore, the thickened part(s) may also accommodate other features, such as means for attaching or coupling the cover to a housing or other structure. Such means may comprise e.g. a thread provided in the body of the thickened part, and of course a co-operating thread in said housing or other structure.

In a special embodiment, the part with the color indicator surface comprises a separate part that is located at a distance from the cover. An advantage of this embodiment is that it requires less material. In principle, it suffices for the cover to be a part with a uniform thickness, i.e. with a minimum amount of material. It is however still possible and, in terms of mixing, even advantageous if the cover has a thickened part towards its circumference. This thickened part may then however be thinner. Furthermore, the separate part, which may be referred to as the color indicator part or, in a particular embodiment to be discussed below, also a 'glow ring', may also be a part with a uniform thickness. The color indicator part may e.g. extend along the intended color indication surface. This ensures minimum amounts of material. Another advantage is that additional mixing of the light may occur between the cover and the color indicator part. This may be brought about by increasing the distance between said cover and said part, which in general improves mixing. One may also use additional scattering at either surface of the cover and/or the color indicator part.

The invention as a whole, and in particular embodiments with the above feature, is also advantageous in that it allows a reduced building depth of the lighting system. Improved mixing is achieved in a direction perpendicular to the direction of the building depth. The LEDs may be accommodated close to the cover while still sufficient mixing may be obtained. Conventional lighting systems, such as the one in WO2005/106323, that try to obtain good mixing, often make use of mirroring in the direction of the depth of the lighting system. This increases the building depth. Furthermore, it is not convenient to try to redirect the light via the back of the LEDs, because the space behind the LEDs is often filled with control circuitry, cooling devices, et cetera. Therefore, the invention, in which light is redirected sideways, offers big advantages in keeping the depth of the system small. This in turn allows many more designs and applications, such as close to objects to be illuminated and in situations with little space, such as small houses.

Another advantage of providing a separate color indicator part is that a part of the incident light may be reflected in the direction of the main light emission. This ensures that the total intensity is somewhat increased, but more importantly also that the mixing of the emitted light is improved. This is in part due to the fact that the light from, in principle, all LEDs is already mixed before it leaves the cover. Moreover, the fact that mixed light is added also ensures that a possible predominance of a certain color in a certain part of the emitted beam is counteracted by said added light. In particular, this is noticeable when some object is located such that it throws a shadow on a more remote object, such as a wall. In case the light is not well-mixed close to the lighting system, such a shadow will show clear color fringes. By adding well-mixed light very close to the main light emitting surface, the color fringes are reduced.

In a particular embodiment, the part, i.e. the color indicator part, has an inner surface facing the cover, the inner surface being substantially smooth. Herein, 'substantially smooth' means optically smooth, not roughened or diffusive, such that scattering is less than 15%, preferably less than 5%. This ensures that the part is able to reflect a sufficient amount of the light back in the direction where main light emission occurs. However, it should preferably also be ensured that the part transmits a sufficient amount of light for the color to be clearly perceptible from the outside. The skilled person will then set the relative transmission according to the requirements and according to the amount of light supplied to the part. This embodiment is especially advantageous if the color indicator part has a diameter which increases in the direction of main light emission, which often, but not necessarily, is an axis of symmetry of the lighting system. This allows a large part of the light to be reflected into the direction of main light emission, while it also ensures that the color indicator surface is visible from the sides and the rear of the lighting system.

In a special embodiment, the part, i.e. the color indicator part, comprises a circumferential ring. This is a simple and elegant way of providing a color indicator part with a large color indication surface, depending on the width of the ring, and with a high degree of design freedom. Alternatively, it comprises e.g. a plurality of rings, or a plurality of non-contiguous parts, around the cover.

Advantageously, the main light emitting surface is substantially flat. Herein, 'substantially flat' means that the ratio of the thickness of the main light emitting surface to the maximum diameter of said surface is less than 0.2, preferably less than 0.1, in other words meaning that the main light emitting surface is relatively thin. This ensures a very small building depth of the lighting system. Still, mixing is good, since this hardly depends on building depth in the present invention. Of course, alternatively, it is possible to provide more or less curved surfaces for the cover.

In a special embodiment, the reflector is shaped and positioned with respect to the LEDs and the part with the color indicator surface, such that no light from the LEDs can reach said color indicator surface directly. This is particularly advantageous in that it ensures that much of the light may be directed 'forward' in the main emission direction, and no direct light can hinder the mixing or color perception on the color indicator part. It also further ensures a small building depth. It is to be noted that in many cases the properties of the reflector are not aimed at providing e.g. a parallel beam of light. Rather, the reflector serves, on the one hand, to ensure that as large an amount of light as possible is focused into a desired beam and, on the other hand, it often (not always) serves as a "carrier" for a diffuser. In order to further improve mixing, the reflector is often provided with a diffuser surface, be it a diffusive coating or a surface roughening or the like. Hence, advantageously, the reflector (at least a part of the surface in the housing that is illuminated by the LEDs) comprises a diffuser. Often, a diffusive coating would be white to ensure that a large part of the incident light is reflected, such as at least 80%, but preferably at least 90%.

In particular, the LEDs comprise at least three different LEDs of the RGB system, and preferably the LEDs comprise at least four different LEDs of the RGBA system (R=red, G=green, B=Blue, and A=amber). Other combinations are of course possible, such as two or more LEDs that emit different tones of white light, or simply only two types of LED, or combinations thereof. With such combinations, it is envisaged that any desired color can be made and mixed.

In a special embodiment, at least one LED is a side-emitter LED (=bat wing LED). Such an LED has a very low emission in the forward direction, but a high emission towards the sides. This ensures that there is little direct light towards the cover, which further improves mixing. Other types of LED are not excluded, such as the normal lambertian LEDs that emit in a hemisphere. Such other types are useful e.g. in lighting systems with less stringent demands on building depth.

Preferably, the LEDs are controllable, such that the color of the total emitted light may be varied. This allows adaptation of the emitted color as desired, which is useful when color wishes change, such as for interiors in houses or shops. A suitable control, which is known per se to the skilled person, may be built into the system.

The invention also relates to a color indicator for use in the lighting system according to the invention, comprising an at least partly transparent body with a substantially flat main light emitting surface and a color indicator surface, wherein the color indicator surface and the main light emitting surface are separate surfaces that make an angle with respect to each other. The advantages as discussed for the lighting system according to the invention also hold for the color indicator as a separate part, so they need not be repeated here. The same holds for the special or advantageous features of the corresponding parts of said system, which hold similarly for the color indicator.

In short, the color indicator may be a unitary part, wherein the color indicator surface is part of the cover for a lighting system, or the color indicator may be a combination of a cover for a lighting system and a color indicator part as mentioned for the lighting system according to the invention.

In particular, the angle is at least 75°, and preferably more than 90°. Advantageously, an outer surface of the color indicator is a diffusive surface, preferably a roughened surface.

In a special embodiment, the color indicator has a body with a thickened part towards its circumference, such that the color indicator surface has a width of at least 1 cm, preferably at least 2 cm.

BRIEF DESCRIPTION OF THE DRAWINGS

The invention will now be elucidated by means of exemplary and non-limiting embodiments, taken in conjunction with the drawings, in which.

DETAILED DESCRIPTION OF EXAMPLES

Figure 1:
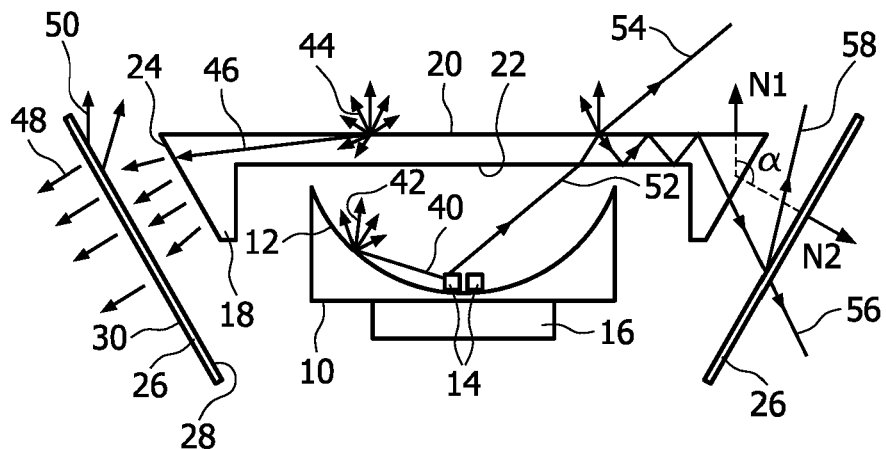
FIG. 1 shows a diagrammatic cross-sectional view of a lighting system according to the invention.

FIG. 1 shows a diagrammatic cross-sectional view of a lighting system according to the invention. The lighting system comprises a housing 10 with a reflector 12 and LEDs 14 with a control unit 16.

A cover is denoted with 18 and has a main light emitting surface 20 and an inner cover surface 22 and a side surface 24.

A color indicator is denoted with 26 and has a color indicator inner surface 28 and a color indicator surface 30. The perpendicular N2 of the color indicator surface and the perpendicular N1 of the light emitting surface enclose an angle α of 125°.

The housing may be any convenient or desired housing, wherein advantageously use may be made of the design freedom as provided by the invention, namely the small required building depth.

The reflector 12 is optional, since the inner surface of the housing 10 may be given a reflective cover or coating, and may be shaped accordingly. The shape of the reflector depends on the lighting requirements. If a narrow parallel beam is desired, a more or less parabola-shaped reflector is useful, although mixing will generally not be very good. Alternatively, if a reflector 12 with a diffusive coating is used, the shape of the reflector is irrelevant. Any compromise in between may be selected by the skilled person.

The two LEDs as shown here for the sake of simplicity may be of any desired type, high power, low power, with or without a lens, et cetera. Their colors and number may be selected according to the lighting wishes, such as for example mainly whitish colors, in which case a number of various white light emitting LEDs may be selected. Otherwise, at least three RGB LEDs, or at least four RGBA LEDs may be selected, or any other combination or type. In particular, side-emitting LEDs are advantageous in that they do not emit (much) light in the forward direction. Note that the reflector 12 is shaped such that no direct light from the LEDs 14 can reach the color indicator 26 directly. This prevents the supply of improperly mixed light to the color indicator.

The control unit 16 may be used to control the power to the LEDs, and thus to control the lighting as a whole. If the LEDs are individually controllable, the color may be changed, which may be checked with the color indicator 26 in an easy and elegant way.

The cover 18 is shown with an optionally thickened part at its circumference. The cover 18 guides a part of the light to the color indicator 26. The way in which this takes place will be shown below, with reference to the various rays of light 40-58.

Firstly, the LEDs emit light, such as a first ray 40, which is partly specularly reflected by the reflector (not further considered here), and partly scattered into first scattered rays 42. This is due to the reflector 12 being at least partly diffusive, e.g. because of a coating or surface roughening. A diffusive reflector 12 is optional, but desirable for improved mixing. The reflected ray and the first scattered rays 42 enter the cover 18, and e.g. scatter further into second scattered rays 44 at the main light emitting surface 20, which, again optionally, is also made diffusive. This double diffusion (reflector and cover) ensures good mixing already at a close range. Part of the second scattered rays, in particular third scattered ray 46, is scattered in such a direction that it can travel inside the cover 18, be it due to internal reflection or a favorable angle of scattering. Third scattered ray 46 travels to the side surface 24. Note that this side surface 24 may function as color indicator surface in the absence of the color indicator 26. The third scattered ray is emitted at the side surface 24 and is incident upon the color indicator inner surface 28. Here, it is partly reflected as color indicator-reflected (or scattered) ray 50, and partly transmitted as color indicator ray 48, which may be perceived by a user from the outside to obtain an indication of the color of the emitted light. The surface 30 points sideways and backwards, which facilitates looking at the surface to check the color.

As regards second ray 52 emitted by the LEDs, this enters the cover 18 directly, and is partly transmitted as second ray 54, and is partly guided by the cover through multiple internal reflections, albeit not total reflections. Note that the intensity will decrease rapidly, except for very small angles of incidence with respect to the surface 22. Nevertheless, part of the light will reach the side surface 24 and be emitted towards the color indicator 26. There, part will be reflected or scattered as second color-indicator-scattered ray 58, and part will be transmitted as second color-indicator ray 56, which will again be visible for an external user. Note that in this case no diffuser at all is required, although it will be clear that either via a diffuser at the cover, e.g. at surface 20, or via diffusive scattering at the reflector 12, the intensity of the light that actually reaches the indicator 26 will be increased.

The color indicator 26 is shown as a frustoconical ring, or 'glow ring'. Of course, the ring could also be cylindrical, or polygonal, or even taperingly conical. It could also be comprised of a plurality of non-contiguous parts.

It is to be noted that FIG. 1 shows a number of optical phenomena in one drawing, for conciseness. In fact, these phenomena will occur concurrently in a working lighting system. However, in the case shown here, there will be symmetry in the left and right part of the drawing. Of course, such symmetry need not be present in other lighting systems.

Figure 2:
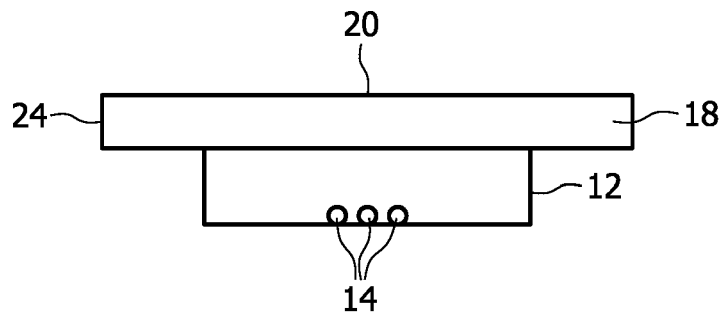
FIG. 2 shows a highly diagrammatic cross-sectional view of another embodiment of the lighting system according to the invention.

FIG. 2 shows a highly diagrammatic cross-sectional view of another embodiment of the lighting system according to the invention. Like reference numerals indicate similar parts throughout the drawings.

In its simplest form, the lighting system comprises a reflector 12 with LEDs 14 and a cover 18 with a main light emitting surface 20 and a side surface 24 which functions as a color indicator surface.

In this case, the reflector 12 is of very rudimentary design, but may e.g. be coated with a highly diffusive coating, which makes the shape of the reflector irrelevant. This in turn allows more design freedom. The cover 18 is taken to have a certain thickness, at least 1 cm, but preferably 2 cm or even more, in order for the side surface 24 to have a sufficiently large surface area. This in turn helps in perceiving the right color in a pleasant and efficient way.

Here, the main light emitting surface 20 need not, but preferably is diffusive, e.g. by being provided with a diffusive coating or layer, or by surface roughening. This highly increases mixing as well as the intensity of the light that is redirected towards the side surface 24. The latter surface functions as the color indicator, in that it emits the mixed light from the LEDs 14, such that the total mixed color is easily perceivable for a user. Preferably, no light from the LEDs reaches the surface 24 directly.

Figure 3:
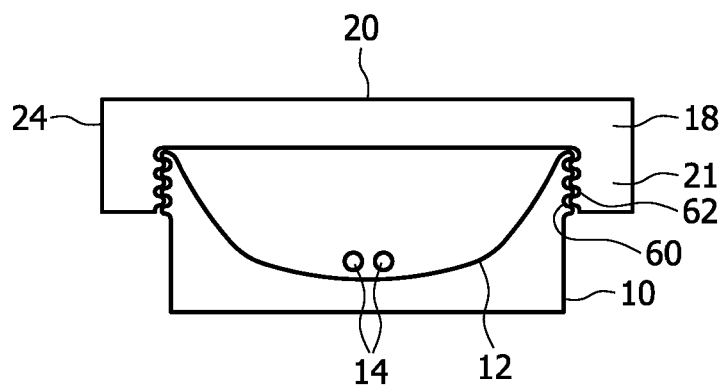
FIG. 3 shows a diagrammatic embodiment of another lighting system according to the invention.

FIG. 3 shows a diagrammatic embodiment of another lighting system according to the invention.

In this Figure, the cover housing 10 comprises first thread means 60. The cover 20 comprises a thickened part 21 with second thread means 62.

The cover 18 with the thread means 62 can be screwed onto the housing 10 with the thread means 60. This ensures an elegant way of removably coupling the cover 18 to the housing 10, although of course other means may be employed.

Note that the thickened part 21 shields the thread means 60 and 62. Furthermore, the thickened part 21 may be selected thick enough to serve as the color indicator according to the invention, due to the possibility of making the main light emitting surface 20 diffusive. In that case, a sufficient amount of light will be guided towards the side surface 24, even "around the corner" of the thickened part 21.

The embodiments described above and shown in the drawings are not meant to be limiting, but rather as illustrative for the principles of the invention. The scope of protection is determined by the appended claims.

The invention claimed is:

1. A lighting system, comprising:
   (i) at least two LEDs, each emitting light of a different color,
   (ii) a housing comprising a reflector at least partly surrounding the LEDs and defining a light exit opening,
   (iii) at least partially transparent cover located in front of the exit opening, and having a main light emitting surface facing away from the LEDs, and
   (iv) a color indicator part located at a distance from the cover and having a color indicator surface arranged to receive the light emitted by the LEDs and internally guided by the cover to the color indicator part, the color indicator surface and the main light emitting surface disposed at an angle with respect to each other,
   wherein the color indicator part has a diameter which increases in the direction of the light emission towards the main light emitting surface.

2. The lighting system according to claim 1, wherein a perpendicular (N2) to the color indicator surface and a perpendicular (N1) to the main light emitting surface enclose an angle α of at least 75°.

3. The lighting system according to claim 1, wherein the cover comprises a diffuser.

4. The lighting system according to claim 3, wherein the diffuser comprises a roughened surface facing away from the LEDs.

5. The lighting system according to claim 1, wherein the color indicator surface comprises a circumferential surface.

6. The lighting system according to claim 1, wherein the color indicator surface has a width of at least 1 cm.

7. The lighting system according to claim 1, wherein the reflector is shaped and positioned with respect to the LEDs and the color indicator part such that no light from the LEDs reaches said color indicator surface directly.

8. The lighting system according to claim 1, wherein the LEDs comprise at least three different LEDs selected from the group consisting of: red, green, blue, and amber.

9. The lighting system according to claim 1, wherein at least one LED is a side-emitter LED.

10. The lighting system according to claim 1, wherein the LEDs are controllable, such that at least one attribute of the total emitted light is variable.

11. The lighting system according to claim 1, wherein the color indicator part comprises a ring, a plurality of rings, or a plurality of non-contiguous parts, disposed around the cover.

* * * * *